United States Patent
Ichikawa

(10) Patent No.: US 11,429,556 B2
(45) Date of Patent: Aug. 30, 2022

(54) DOCUMENT MANAGEMENT APPARATUS AND NON-TRANSITORY COMPUTER READABLE MEDIUM

(71) Applicant: FUJIFILM Business Innovation Corp., Tokyo (JP)

(72) Inventor: Ken Ichikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 156 days.

(21) Appl. No.: 16/847,610

(22) Filed: Apr. 13, 2020

(65) Prior Publication Data
US 2021/0182238 A1 Jun. 17, 2021

(30) Foreign Application Priority Data
Dec. 13, 2019 (JP) .............................. JP2019-225580

(51) Int. Cl.
| G06F 16/10 | (2019.01) |
| G06F 16/11 | (2019.01) |
| G06N 20/00 | (2019.01) |
| G06F 16/188 | (2019.01) |
| G06F 16/16 | (2019.01) |

(52) U.S. Cl.
CPC .......... *G06F 16/122* (2019.01); *G06F 16/168* (2019.01); *G06F 16/188* (2019.01); *G06N 20/00* (2019.01)

(58) Field of Classification Search
None
See application file for complete search history.

(56) References Cited

U.S. PATENT DOCUMENTS

| 6,820,094 B1* | 11/2004 | Ferguson | ................ G06F 16/93 707/999.2 |
| 2011/0047156 A1* | 2/2011 | Knight | ................... G06F 16/285 707/737 |
| 2011/0149332 A1* | 6/2011 | Cho | ....................... G06F 21/608 358/1.14 |
| 2016/0210347 A1* | 7/2016 | Meyer | .................... G06F 16/285 |

FOREIGN PATENT DOCUMENTS

| JP | 2006163544 | 6/2006 |
| JP | 2008176715 | 7/2008 |

* cited by examiner

*Primary Examiner* — Jau Shya Meng
(74) *Attorney, Agent, or Firm* — JCIPRNET

(57) ABSTRACT

A document management apparatus provides an electronic document management service for managing electronic documents by storing the electronic documents in plural folders. The document management apparatus includes a processor configured to cause a learner to learn such that the learner specifies a folder in which an electronic document is stored, based on content of the electronic document stored in the folder and a service attribute assigned to the electronic document by the electronic document management service, and specify a storage destination folder in which a new electronic document is to be stored, based on content of the new electronic document and a service attribute of the new electronic document.

7 Claims, 5 Drawing Sheets

FIG.4

| STORAGE DESTINATION | YEAR 2019>PURCHASE>CLIENT > INDIVIDUAL CONTRACT DOCUMENT |
|---|---|
| DOCUMENT FORMAT | pdf |
| REGISTRANT | TARO FUJI |
| RECEPTION DATE/TIME | 2019/11/27 13:58 |
| REVISION NUMBER | 2 |
| CASE NUMBER | 129-541-315 |
| CASE NAME | INDIVIDUAL CONTRACT |
| CASE STATUS | IN PROGRESS |
| DOCUMENT TYPE | CONTRACT |
| CLIENT | OO COMPANY |
| ... | ... |

DOCUMENT MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-225580 filed Dec. 13, 2019.

BACKGROUND

1. Technical Field

The present disclosure relates to a document management apparatus and a non-transitory computer readable medium.

2. Related Art

A document management system is known that manages electronic documents by storing the electronic documents in a folder. When plural folders are defined in the document management system, it is common that a folder in which an electronic document is to be stored is designated by a user. However, for document management systems of related art, there has been proposed a technique for specifying a folder in which an electronic document is to be stored.

For example, JP-A-2008-176715 discloses a document sharing system that registers a link of an electronic document in a specified folder based on a distribution condition of the electronic document set in advance. JP-A-2006-163544 discloses a document management system that registers an electronic document (image) in each folder. The document management system of JP-A-2006-163544 associates the image forms of the electronic documents with folders in advance, detects a form of an image to be processed, and registers the image to be processed in a folder associated with a form that matches the detected form.

SUMMARY

As described above, when an electronic document is stored in a folder, the document management system of the related art needs to preset a storage condition for an electronic document indicating what electronic document is to be stored in what folder. However, in order to save the labor and time of setting the storage condition for an electronic document, it may be conceivable to cause a learner to learn attributes of electronic documents already stored in folders and specify a storage destination folder for a new electronic document by inputting an attribute of the new electronic document to the learned learner.

Aspects of non-limiting embodiments of the present disclosure relate to making it possible for a learner to specify a more appropriate storage folder for an electronic document when a storage destination folder is specified for an electronic document using a learner in an electronic document management service for managing electronic documents by storing the electronic documents in plural folders as compared with a case where the learner does not consider attributes assigned to electronic documents in a learning process.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document management apparatus that provides an electronic document management service for managing electronic documents by storing the electronic documents in plural folders. The document management apparatus includes a processor configured to cause a learner to learn such that the learner specifies a folder in which an electronic document is stored, based on content of the electronic document stored in the folder and a service attribute assigned to the electronic document by the electronic document management service, and specify a storage destination folder in which a new electronic document is to be stored, based on content of the new electronic document and a service attribute of the new electronic document.

BRIEF DESCRIPTION OF THE DRAWINGS

Exemplary embodiment(s) of the present disclosure will be described in detail based on the following figures, wherein:

FIG. 4 is a view illustrating an example of a service attribute; and

DETAILED DESCRIPTION

Figure 1:
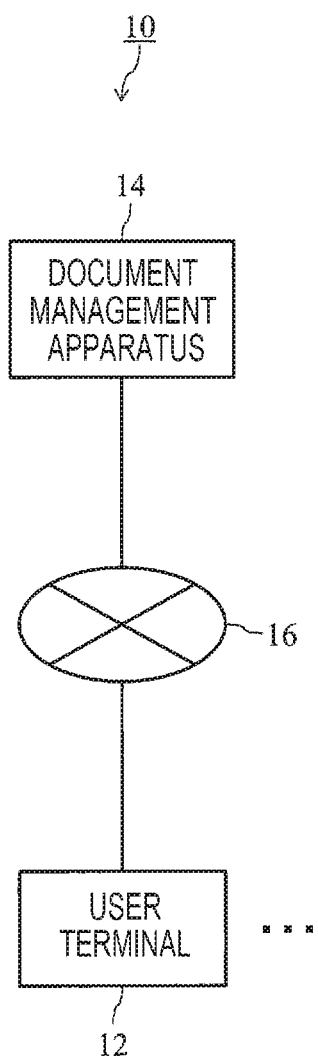
FIG. 1 is a schematic configuration diagram illustrating a document management system according to an exemplary embodiment.

FIG. 1 is a schematic configuration diagram illustrating a document management system 10 according to an exemplary embodiment. The document management system 10 includes one or more user terminals 12 and a document management apparatus 14. The user terminals 12 and the document management apparatus 14 are communicably interconnected via a communication line 16 such as a LAN or the Internet.

The document management system 10 is a system for storing and managing an electronic document transmitted from a user. Specifically, the user uses a user terminal 12 to access the document management apparatus 14, receives an authentication from the document management apparatus 14, and accesses an electronic document management service provided by the document management apparatus 14. Thereafter, the user transmits the electronic document from the user terminal 12 to the document management apparatus 14, and the document management apparatus 14 stores and manages the electronic document in one of plural folders defined in a document DB (which will be described later) provided in the inside or outside of the document management apparatus 14. Further, the document management apparatus 14 transmits the electronic document stored in the document DB to the user terminal 12 in response to a request from the user terminal 12. Thus, the user may use the electronic document being managed by the document management system 10.

The electronic document managed by the electronic document management service may be, for example, document data such as Word, PDF, or program data, or may be image data (including photograph data).

The user terminal 12 is, for example, a terminal such as a personal computer, a smartphone, or a tablet terminal. The user terminal 12 includes a communication unit composed of a network adapter or the like, a storage unit composed of a hard disk, a RAM, a ROM, or the like, a display composed of a liquid crystal display or the like, an input unit composed of a mouse, a keyboard, a touch panel, or the like, and a controller composed of a CPU, a microcomputer, or the like.

Figure 2:
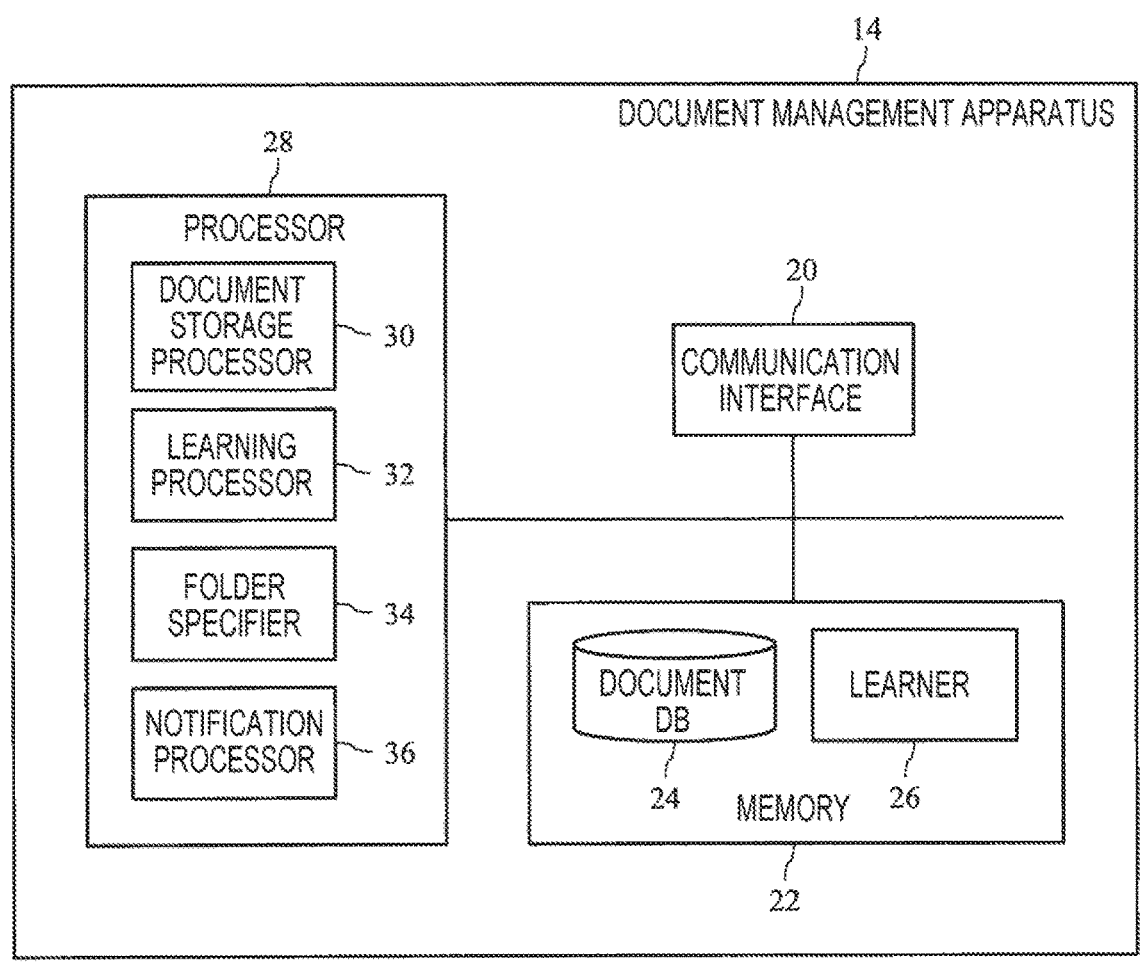
FIG. 2 is a schematic configuration diagram illustrating a document management apparatus according to the present exemplary embodiment.

FIG. 2 is a schematic configuration diagram illustrating the document management apparatus 14. The document management apparatus 14 is implemented by, for example, a server computer. Further, a function (which will be described later) of the document management apparatus 14 may be implemented by plural devices (for example, plural server computers). The document management apparatus 14 provides an electronic document management service that manages the electronic document by authenticating the user who has accessed using the user terminal 12 and storing the electronic document in the plural folders for the authenticated user. In the present specification, storing an electronic document in the document management apparatus 14 may be referred to as registering the electronic document in the electronic document management service.

A communication interface 20 includes, for example, a network adapter or the like. The communication interface 20 has a function of communicating with one or more user terminals 12 via the communication line 16.

A memory 22 includes, for example, a hard disk, a solid state drive (SSD), a ROM, a RAM, or the like. The memory 22 may be provided separately from a processor 28 to be described later, or at least a portion thereof may be provided in the inside of the processor 28. A document management program for causing elements of the document management apparatus 14 to operate is stored in the memory 22. As illustrated in FIG. 2, a document DB 24 and a learner 26 are stored in the memory 22.

The document DB 24 is a database in which plural electronic documents managed by the document management apparatus 14 are stored. In the present exemplary embodiment, the document DB 24 is stored in the memory 22 of the document management apparatus 14. Alternatively, the document DB 24 may be a database stored in an external device of the document management apparatus 14.

A user of the document management system 10 may define plural folders in the document DB 24. Specifically, the user may set a folder structure such as the number of folders, the hierarchical structure of folders, or the name of each folder. Surely, since many users access the document DB 24, the user of the document management system 10 may set a user who may access the defined folders. For example, the representative of a company defines a folder structure in the document DB 24, and sets plural folders included in the folder structure so that employees of the company may access the folders.

By setting plural folders, the system user may store plural electronic documents dividedly in the plural folders. An electronic document is stored in each folder according to a predetermined rule. For example, a company representative sets plural folders so as to correspond to the year, department, electronic document type, project, and the like, and determines a company rule that each electronic document is stored in the corresponding folder. For example, an order document for a sales department is stored in an order document folder below a sales department folder. By doing so, a user may easily find a target electronic document from the document DB 24 later. In other words, the electronic document needs to be stored in an appropriate folder.

Figure 3:
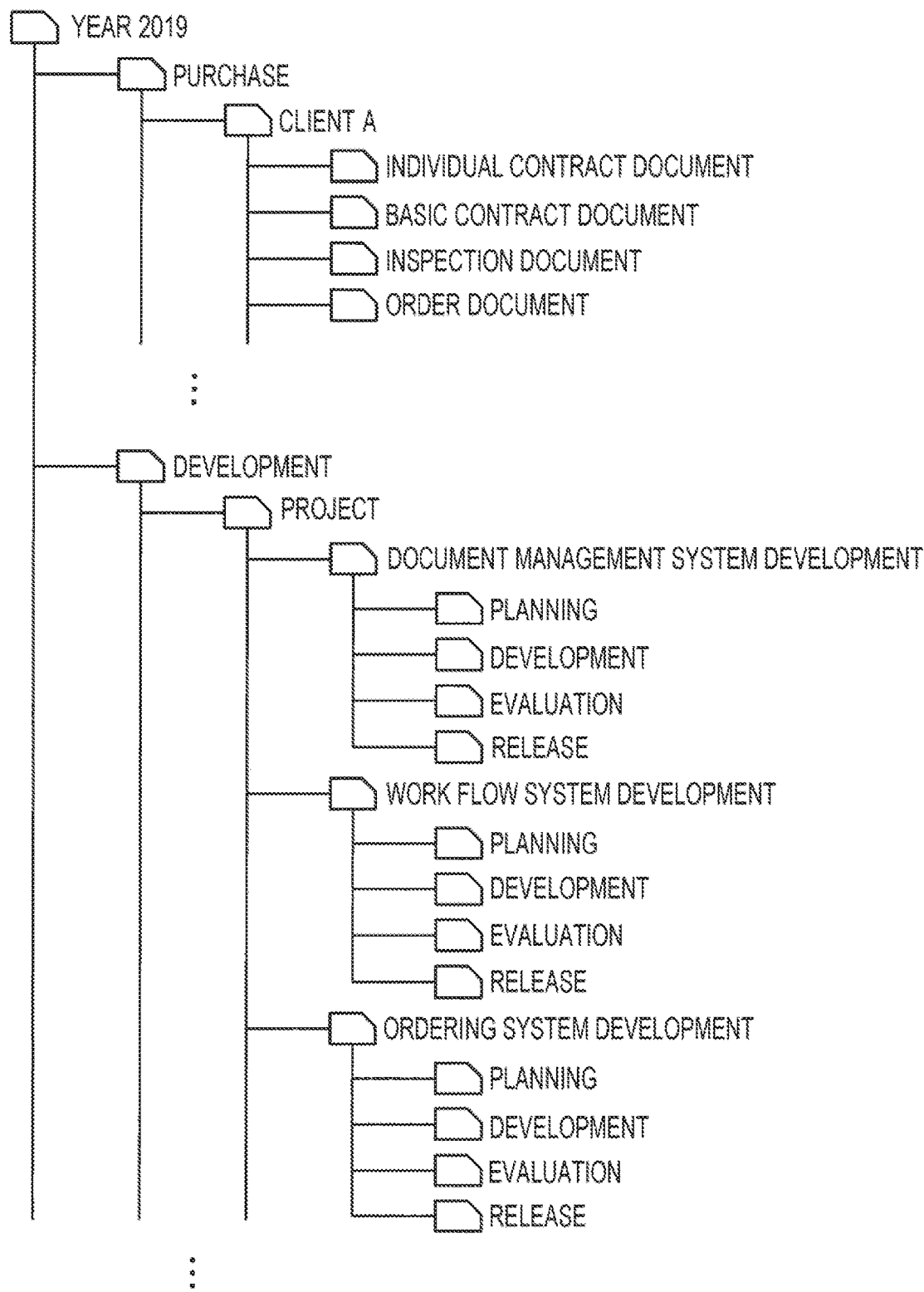
FIG. 3 is a conceptual diagram illustrating an example of a folder structure of a document DB.

FIG. 3 is a diagram illustrating an example of a folder structure defined in the document DB 24. In the example of FIG. 3, a "purchase" folder and "development" folder are defined below a "Year 2019" folder, and plural folders are also defined below each of the "purchase" folder and "development" folder.

The "purchase" folder is a folder that stores electronic documents related to purchase. A folder for each client (for example, a "client A" folder) is defined below the "purchase" folder. Further, folders for each type of document (for example, an "individual contract document" folder, a "basic contract document" folder, an "inspection document" folder, and an "order document" folder) are defined below the folder of the client. A rule is predetermined such that the purchase-related electronic documents are stored in appropriate folders according to the client and the types of documents.

A folder structure according to a business process may be defined in the document DB 24. As used herein, the business process refers to a process that defines steps necessary for completing a single project and documents required to be created in each step. The steps may include, for example, planning, development, evaluation, release, and so on. Documents required for the planning step may include, for example, a development planning document, an issue management list, and so on. Documents required for the development step may include, for example, a basic design document, a detailed design document, and so on. Documents required for the evaluation step may include, for example, a test planning document, a test result report, and so on. Documents required for the release step may include, for example, a release preparation completion report, a release approval document, and so on. Surely, the content of the above-mentioned steps and the documents required for each step are merely examples.

In the example of FIG. 3, the plural folders below the "development" folder have a folder structure according to a business process. Specifically, a "project" folder is defined below the "development" folder, and a folder corresponding to each project (for example, a "document management system development" folder) is defined below the "project" folder. Further, folders (a "planning" folder, a "development" folder, an "evaluation" folder, and a "release" folder) corresponding to each step are defined below the folder corresponding to each project. A rule is predetermined so that the electronic documents related to each project are stored in appropriate folders according to the related-project name and step.

Many folders may be defined in the document DB 24. When many folders are defined in the document DB 24, a user may not know in which folder an electronic document to be registered in the document DB 24 needs to be stored. In particular, it may be difficult for a newcomer or a person who has just participated in a project to know where the folder in which the electronic document is to be stored is. Alternatively, even when the folder in which the electronic document is to be stored is clear, for example, when the target folder is deep in the hierarchy, an operation for selecting the target folder may be troublesome.

Returning to FIG. 2, the learner 26 includes a model such as a deep neural network or logistic regression. The details of the learner 26 will be described later together with a process of a learning processor 32 to be described later. The entity of the learner 26 includes a program that defines the structure of the learner 26, various parameters related to the learner 26, and a process execution program for performing a process on input data. Therefore, storing the learner 26 in the memory 22 means that the programs and various parameters are stored in the memory 22.

The processor 28 refers to a broadly-defined processing device and includes at least one of a general-purpose processing device (for example, a CPU (Central Processing Unit) or the like) and a dedicated processing device (for example, a GPU (Graphics Processing Unit), an ASIC (Application Specific Integrated Circuit), an FPGA (Field Programmable Gate Array), a programmable logic device, or the like). The processor 28 may not be implemented by one processing device but may be implemented by cooperation of plural processing devices existing at physically separated positions. As illustrated in FIG. 2, the processor 28 functions as a document storage processor 30, a learning processor 32, a folder specifier 34, and a notification processor 36 by execution of the document management program stored in the memory 22.

The document storage processor 30 stores a new electronic document transmitted from the user terminal 12 in any folder of the document DB 24. The storage destination folder for the new electronic document may be designated by the user, or may be specified by the learner 26. The method of specifying the storage destination folder by the learner 26 will be described later. Here, descriptions will be made on a process of the document storage processor 30 when the storage destination folder is designated by the user.

The user selects a storage destination folder for the new electronic document and transmits information indicating the selected storage destination folder to the document management apparatus 14 together with the new electronic document. The document storage processor 30 stores the new electronic document in the storage destination folder indicated by the information.

The document storage processor 30 stores the new electronic document in the storage destination folder and assigns an attribute to the new electronic document. The attribute assigned to the new electronic document by the document storage processor 30 is a service attribute assigned to the new electronic document by the electronic document management service. The service attribute is an attribute related to the electronic document and includes an attribute related to an operation of registering the electronic document in the electronic document management service, or an attribute indicating properties (document format, document type, and the like) of the electronic document itself.

FIG. 4 illustrates an example of the service attribute. The service attribute includes a "storage destination" indicating the storage destination folder for an electronic document, a "document format" indicating the format or extension of the electronic document, a "registrant" indicating a person who has registered the electronic document in the electronic document management service, a "reception date and time" indicating the date and time when the electronic document management service received the electronic document, a "revision number" indicating the revision number (that is, version) of the electronic document, a "case number" which is an identification number of the electronic document in the electronic document management service, a "case name" indicating the name of the electronic document in the electronic document management service, a "case status" indicating the process status according to the electronic document, a "document type" indicating the type of the electronic document, and a "client" indicating the client of the electronic document.

In the above description, the "registrant" and the "reception date and time" correspond to attributes related to an operation of registering the electronic document in the electronic document management service.

As described above, the service attributes are assigned by the document storage processor 30. Specifically, the "storage destination" may be specified by detecting a folder in which a new electronic document is stored or a storage destination folder designated by the user. The "document format" may be specified by detecting the extension of the electronic document. The "registrant" may be specified based on authentication information of the user who has transmitted the electronic document. The "reception date and time" may be specified based on the date and time when the electronic document is received. The "revision number" may be specified by analyzing information attached as metadata of the electronic document or the content of the electronic document by an OSR process or the like and acquiring the version of the electronic document. For the "case number", the document storage processor 30 may assign a number for uniquely identifying the received electronic document.

Further, at least a part of the service attributes may be designated by the user. For example, the "case name", the "case status", the "document type", and the "client" may be designated by the user. These attributes are assigned to the new electronic document by the document storage processor 30 based on information sent from the user terminal 12.

The above-described service attributes are just examples and may include other attributes as long as they may be assigned by the electronic document management service.

The service attributes assigned by the document storage processor 30 are registered in the document DB 24 in association with the electronic document (for example, as metadata of the electronic document).

The learning processor 32 performs a process of causing the learner 26 to learn. Specifically, the learning processor 32 uses the content of the electronic documents stored in the folders of the document DB 24, the service attributes of the electronic documents, and the folders in which the electronic documents are stored, as training data, to make the learner 26 learn so as to specify the folder in which a specific electronic document is stored, in learning by the learner 26, the content and service attributes of the electronic document are used as explanatory variables, and the folder in which the electronic document is stored is used as an objective variable.

The learning processor 32 acquires the content of the electronic document by analyzing the electronic document stored in the folder of the document DB 24. For example, the learning processor 32 first extracts a character string included in the electronic document. When the electronic document is document data such as Word or PDF, the character string may be extracted by using an existing tool. When the electronic document is image data, the character string may be extracted by performing an OCR process.

Next, the learning processor 32 classifies the extracted character string into words by performing natural language processing such as morphological analysis on the extracted character string. Then, the learning processor 32 acquires, as the content of the electronic document, plural words (for example, the top 10 words) having a high appearance frequency among the words thus obtained. For example, when the electronic document is a contract, words such as "contract", "estimate", "company", "order", "parts", "delivery", "delivery date", and "expiration date", are acquired as the content of the electronic document. The content of the electronic document may be acquired by using methods other than the above-described method.

Figure 5:
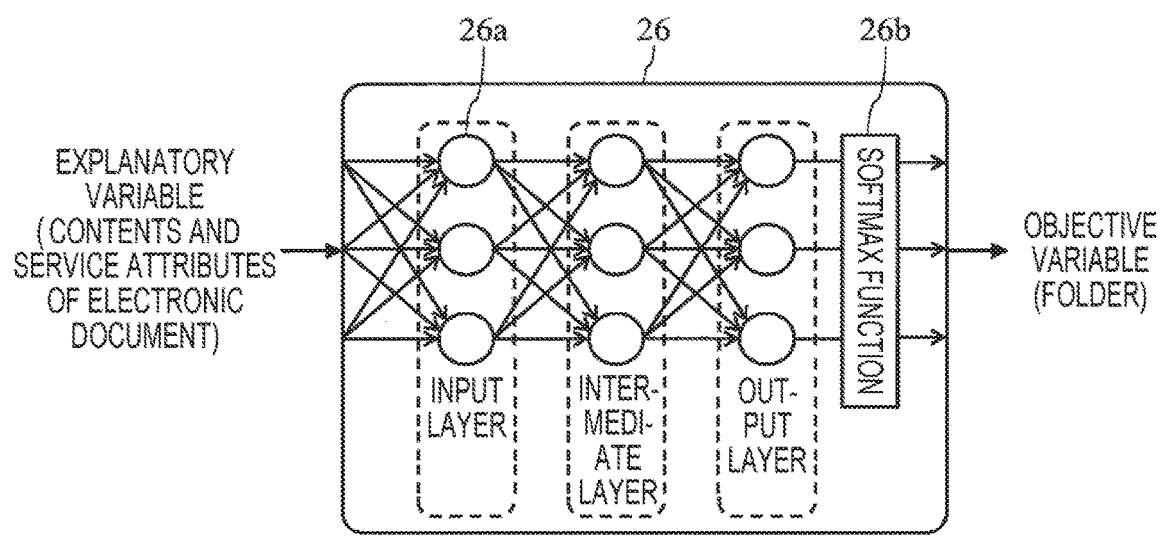
FIG. 5 is a schematic configuration diagram illustrating a learner.

FIG. 5 illustrates a state of the learning processing of the learner 26 by the learning processor 32. FIG. 5 illustrates the structure of a deep neural network that includes plural layers (an input layer, an intermediate layer, and an output layer) each including plural neurons 26a, as the learner 26, and a softmax function 26b as an activation function. However, as described above, the learner 26 is not limited thereto.

The learning processor 32 inputs the content of the electronic document acquired and the service attributes of the electronic document to the learner 26 as explanatory variables. The learner 26 specifies and outputs a folder in which the electronic document is to be stored, based on the input. More specifically, a probability that each of all folders defined in the document DB 24 is a folder in which the electronic document is to be stored is output by the softmax function 26b.

The learning processor 32 specifies a folder having the highest probability among the outputs of the softmax function 26b, as an output value (folder) of the learner 26. In addition, the learning processor 32 calculates an error between a folder (training data) in which the electronic document is actually stored, which is an objective variable, and the output value of the learner 26. Then, the learning processor 32 makes the learner 26 learn such that the error is reduced by a method such as back propagation. Specifically, the weight and bias value of each of the neurons 26a included in the learner 26 are corrected.

When the learning processor 32 repeats the learning of the learner 26 based on the content and service information of the plural electronic documents stored in each folder of the document DB 24 and the folder in which each electronic document is stored, the learner 26 may specify the storage destination folder in which the electronic document is to be stored, based on the content and service information of the electronic document.

Here, in the learning process of the learner 26, the output accuracy or learning efficiency of the learner 26 may be improved by adding the service attribute of the electronic document to the explanatory variable. This is because the service attribute of the electronic document is correlated with the storage destination folder for the electronic document. For example, it may be pointed out that plural electronic documents having similar service attributes are highly liable to be stored in the same folder. For example, when the registrant of an electronic document is the same, the electronic document is often stored in the same folder (in other words, the same user often stores the electronic document in the same folder).

In the electronic document management service, there is a tendency that before a first electronic document is stored in a first folder, a second electronic document related to the first electronic document is stored a second folder. In other words, there is a tendency that immediately after the second electronic document is stored in the second folder, the first electronic document related to the second electronic document is stored in the first folder. Here, the first folder and the second folder may be the same folder or other folders.

For example, as described above, when a folder structure corresponding to a business process is defined in the document DB 24, there is a tendency that immediately after a development planning document of a project as the second electronic document is stored in a "planning" folder of the project, an issue management list of the project is stored as the first electronic document in the same "planning" folder. In such a case, when the development planning document of the same project is stored in the "planning" folder more than a predetermined time before receiving the issue management list of the project as a new electronic document, it may be said that the issue management list has a high probability of being stored in the "planning" folder.

Therefore, the learning processor 32 may cause the learner 26 to learn with the explanatory variables including not only the content and service attributes of the first electronic document stored in the first folder but also the second electronic document which is related to the first electronic document and which is stored in the second folder more than a predetermined time before registration of the first electronic document in the first folder. Thus, the learner 26 may learn a tendency that the first electronic document is stored in the first folder after the second electronic document is stored in the second folder.

The folder specifier 34 inputs the content and service attributes of the new electronic document transmitted from the user terminal 12 to the learned learner 26, thereby specifying a storage destination folder in the document DB 2.4 in which the new electronic document is to be stored. The folder specifier 34 acquires the content of the new electronic document by the same method as the learning processor 32 and acquires the service attributes of the new electronic document by the same method as the document storage processor 30. Meanwhile, since "storage destination" of the new electronic document among the service attributes illustrated in FIG. 4 is not determined, the folder specifier 34 specifies an attribute other than "storage destination", as the service attribute of the new electronic document.

As described above, in the electronic document management service, there is a tendency that immediately after the second electronic document is stored in the second fold, the first electronic document related to the second electronic document is stored in the first folder. When the learner 26 has sufficiently learned the tendency, the folder specifier 34 may again input, to the learner 26, not only the content and service attributes of the new electronic document but also the related electronic document related to the new electronic document and stored in the second folder within a predetermined time after reception of the new electronic document, and then may cause the learner 26 to specify a storage destination folder for the new electronic document in consideration of the related electronic document.

For example, a case is considered where immediately after a development planning document of a project is stored in the "planning" folder of the project, the learner 26 has sufficiently learned a tendency that an issue management list of the project is stored in the same "planning" folder. In this case, when the issue management list of the project is received as a new electronic document, and when the development planning document of the project is stored in the "planning" folder of the project immediately before, there is an increasing possibility that the same "planning" folder is specified as a storage destination folder of the issue management list by inputting the development planning document to the learner 26.

The document storage processor 30 stores the new electronic document in the storage destination folder specified by the folder specifier 34. This allows a user to store the new electronic document in an appropriate folder without designating a storage destination of the new electronic document.

The notification processor 36 transmits information indicating the storage destination folder for the new electronic document specified by the folder specifier 34 to the user terminal 12, thereby notifying the user of the storage destination folder. The notification processor 36 notifies the user before the document storage processor 30 stores the new electronic document in the document DB 24. Whether the notification processor 36 notifies the user of the storage destination folder or whether the document storage processor 30 stores the new electronic document in the specified storage destination folder without performing the notification may be selected by user setting.

As described above (see also FIG. 5), the learner 26 outputs, from the softmax function 26b, a probability that each of all folders defined in the document DB 24 is a folder in which a new electronic document is to be stored, in other words, a probability that each of all folders defined in the document DB 24 is suitable as a storage destination folder for the new electronic document. Therefore, the notification processor 36 may notify the user of plural storage destination folders suitable for a new electronic document based on the output of the learner 26. For example, the notification processor 36 notifies the user of the top several storage destination folders having a high probability which are suitable as storage destination folders for the new electronic document. When notifying the user of the plural storage destination folders, it is suitable for the notification processor 36 to notify the user of suitability rankings of plural storage destination folders for a storage destination of the new electronic document.

Although the exemplary embodiments of the present disclosure has been described above, the present disclosure is not limited to the above exemplary embodiments, but various modifications thereof may be made without departing from the spirit and scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document management apparatus that provides an electronic document management service for managing electronic documents by storing the electronic documents in a plurality of folders, the document management apparatus comprising:
    a processor; and
    a memory to store instructions, the instructions executed by the processor to perform to:
        cause a learner to learn such that the learner specifies a folder in which an electronic document is stored, based on content of the electronic document stored in the folder and a service attribute assigned to the electronic document by the electronic document management service; and
        specify a storage destination folder in which a new electronic document is to be stored, based on content of the new electronic document and a service attribute of the new electronic document,
    wherein the instruction is further executed by the processor to perform to:
        cause the learner to learn such that the learner specifies a first folder in which a first electronic document is stored, based on (i) content of the first electronic document stored in the first folder, (ii) a service attribute of the first electronic document, and (iii) a second electronic document related to the first electronic document and that is stored in a second folder within more than a predetermined time before registration of the first electronic document in the first folder; and
        specify the storage destination folder based on (i) the content of the new electronic document, (ii) the service attribute of the new electronic document, (iii) an electronic document related to the new electronic document and stored in the second folder more than the predetermined time before reception of the new electronic document, and (iv) the learned learner.

2. The document management apparatus according to claim 1, wherein the service attribute is an attribute related to an operation of registering an electronic document in the electronic document management service.

3. The document management apparatus according to claim 2, wherein the service attribute comprises at least one of (i) a registrant who registers an electronic document with the electronic document management service or (ii) date and time when the electronic document management service receives the electronic document.

4. The document management apparatus according to claim 1, wherein the instructions executed by the processor to perform to store the new electronic document in the specified storage destination folder.

5. The document management apparatus according to claim 1, wherein the instructions executed by the processor to perform to notify a user of one or more specified storage destination folders.

6. The document management apparatus according to claim 5, wherein the instructions executed by the processor to perform to notify the user of suitability rankings of the plural storage destination folders for the new electronic document.

7. A non-transitory computer readable medium storing a program that causes a processor of a document management apparatus to execute document management processing, the document management apparatus that provides an electronic document management service for managing electronic documents by storing the electronic documents in a plurality of folders, the document management processing comprising:
    causing a learner to learn such that the learner specifies a folder in which an electronic document is stored, based on content of the electronic document stored in the folder and a service attribute assigned to the electronic document by the electronic document management service; and
    specifying a storage destination folder in which a new electronic document is to be stored, based on content of the new electronic document and a service attribute of the new electronic document,
    wherein the document management processing further comprising:
        causing the learner to learn such that the learner specifies a first folder in which a first electronic document is stored, based on (i) content of the first electronic document stored in the first folder, (ii) a service attribute of the first electronic document, and (iii) a second electronic document related to the first electronic document and that is stored in a second folder within more than a predetermined time before registration of the first electronic document in the first folder; and specifying the storage destination folder based on (i) the content of the new electronic document, (ii) the service attribute of the new electronic document, (iii) an electronic document related to the new electronic document and stored in the second folder more than the predetermined time before reception of the new electronic document, and (iv) the learned learner.

* * * * *